(No Model.)
S. ESSEX.
CONVEYER CHAIN OR LINK BELT.
No. 531,306. Patented Dec. 25, 1894.
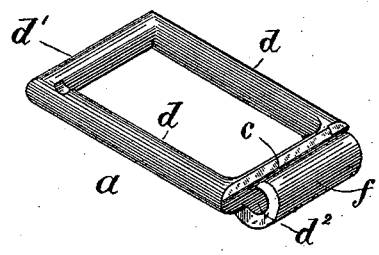
Fig. 1
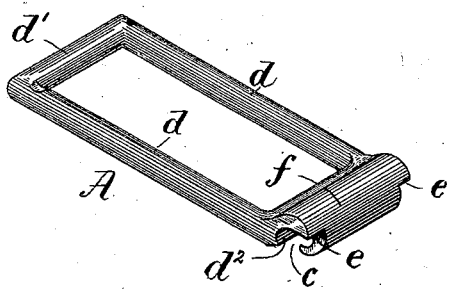
Fig. 2
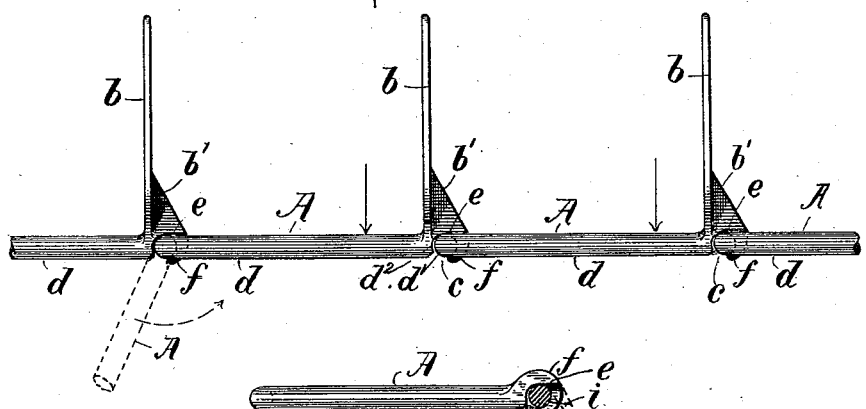
Fig. 3
Fig. 4
WITNESSES
William D. Rundlett.
Ida M. Warren.
INVENTOR
Stephen Essex.
by Remington & Henthorn
Attys.
THE NORRIS PETERS CO., PHOTO-LITHO., WASHINGTON, D. C.

UNITED STATES PATENT OFFICE.

STEPHEN ESSEX, OF PROVIDENCE, RHODE ISLAND.

CONVEYER-CHAIN OR LINK BELT.

SPECIFICATION forming part of Letters Patent No. 531,306, dated December 25, 1894.

Application filed May 28, 1892. Serial No. 434,715. (No model.)

*To all whom it may concern:*

Be it known that I, STEPHEN ESSEX, a citizen of the United States, residing at Providence, in the county of Providence and State of Rhode Island, have invented certain new and useful Improvements in Conveyer-Chains or Link Belts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My improvement has relation to a detachable link belt and detachable conveyer chain and while it is peculiarly adapted thereto it is useful for many other purposes and can be applied in various combinations. It comprises a link with a coupling hook portion combined with shoulders or bearing faces formed on extensions of the side bars along side the hook portions, said extensions reaching to the front part of the hook socket to bear on the side bar of the adjacent link within the fulcrum point thereof, so that the two links will be maintained in substantially horizontal position and prevent the chain from sagging and thus rendering applied carriers rigid in their relation to each other when working, said extension of the side bars when desired, forming shields to the joint at the connection of the links by bending them around or over said joint to the front of the hook socket.

In the accompanying drawings—Figure 1. is a perspective view of a well known form of link adapted to be employed in link belts. Fig. 2. is a similar view of a link embodying my improvement. Fig. 3. is a side elevation showing a piece of my improved link belt provided with flanges or flights, and Fig. 4. is a side view modified.

My improved link is well illustrated in Fig. 2. The side bars $d$ of this link extend from the hook end $f$ and are united at their opposite ends by the cross tie $d'$. $c$ is the mouth or socket of the hook. $d^2$ is the hook eye or bearing. The links are arranged to interlock by first placing each in the broken line position, Fig. 3, and moving it laterally into the hook eye, Fig. 2, followed by swinging it in the arrow direction Fig. 3 until its adjacent sides are arrested by the shoulders on the stop extensions $e, e$, Fig. 2, of the side bars as shown in full lines Fig. 3. These parts $e, e$, extend over from the side of the hook eye or socket $d^2$ adjacent to the root of the hook to the opposite side of said hook eye or socket terminating in a bearing shoulder or surface situated at the front of the hook socket and as this terminal shoulder is in the same plane with the upper side of the side bar it will be in position to bear on the upper side of the side bar of the adjacent link at a point thereon within or forward of the fulcrum point so that the two links will be maintained rigidly in horizontal position against sagging to support carriers and flights with contained material on their upper sides. For the purpose of securing this terminal bearing in line with the front of the hook socket the extensions of the side bars are bent around the hook socket as shown more clearly in Fig. 4.

The extensions $e, e$, with their bearing shoulders provide in effect a short beam or truss to give rigidity to the connection in one direction to maintain the links in the same plane. Said extensions and bearing shoulders in no wise effect the free running of the chain nor do these or the manner of interlocking effect the form or position of carriers wherever employed permitting one entire face of the chain to be occupied by carriers. Said extensions are extended laterally to the root of the hook so that the root of the hook and extensions are practically integral and form a shield for the joint between the connecting links.

The invention may be applied to ladders or fire escapes the chain being rigid in one direction and capable of sustaining great weight on its rigid side.

When the chain is to be used as a conveyer I further provide it with suitable flanges, buckets or flights, according to the nature of the material to be conveyed by it. In the drawings, Fig. 3, each link A is provided at its hook end with a thin partition or flange $b$. Practically the partition and link are integral, the parts being strengthened at the point of union by ribs or fillets b'. As drawn the chain is more especially adapted to convey potatoes from one point to another, as for example when used in a potato planter.

My improved chain possesses advantages over other link-belts in that the upper or working side of each link acts as a closed guard or shield and at the same time the end shoulders e, e, prevent the chain from sagging because each link acts to support its fellow-link, thereby dispensing with the use of bottom guides for the links to rest upon and the increased working friction due to their presence.

In some cases the hook or coupling portion f of the link may be bent or closed in to form a complete eye, after the bar d' of the fellow-link has been placed in position, as shown at i, Fig. 4; the bar being sectionally represented. In thus producing the eye the metal of the hook may be first formed substantially flat, as indicated by the broken lines and then bent around the bar of the adjacent link.

My improved interlocking chain may be readily adapted to be employed as an elevator or carrier of water or other liquids, as well as of goods or merchandise.

I claim as my invention—

1. A chain link having a hooked portion and a bearing shoulder adjacent thereto and at the front side of the hook socket to bear on the side bar of the adjacent link forward of the fulcrum point thereof to hold the links substantially in the same plane and rigid against movement in one direction, substantially as described.

2. A chain link having a hooked portion and a bearing shoulder adjacent thereto and at the front side of the hook socket to bear on the side bar of the adjacent link forward of the fulcrum point thereof to hold the links substantially in the same plane and rigid against movement in one direction, said shoulder being carried by an extension of the side bar bent over the hook socket to the front side thereof, substantially as described.

3. A chain link, having a hooked portion and an extension from the side bars bent over the hook socket and forming a lateral extension of the hook, said extension providing a shield for the joint between the links and having a bearing shoulder at the front in the plane of the upper sides of the side bars.

4. In combination in a link chain, the hook having the hook portions with the side bar extensions having bearing shoulders at their front ends to bear on the side bars of the adjacent links forward of the fulcrum point whereby the links will be maintained in the same plane against movement in one direction and the flights or carriers attached to the rigid side of the said chain, substantially as described.

In testimony whereof I have affixed my signature in presence of two witnesses.

STEPHEN ESSEX.

Witnesses:
GEO. H. REMINGTON,
IDA M. WARREN.